US008880695B2

(12) United States Patent
Sakai et al.

(10) Patent No.: US 8,880,695 B2
(45) Date of Patent: Nov. 4, 2014

(54) INFORMATION PROCESSING APPARATUS AND INFORMATION PROCESSING METHOD

(75) Inventors: Shimon Sakai, Kanagawa (JP); Yuji Ishimura, Tokyo (JP); Keiichi Aoyama, Tokyo (JP); Naoki Ode, Chiba (JP); Masayuki Ebata, Kanagawa (JP); Tadashi Ehara, Kanagawa (JP)

(73) Assignee: Sony Corporation (JP)

( * ) Notice: Subject to any disclaimer, the term of this patent is extended or adjusted under 35 U.S.C. 154(b) by 172 days.

(21) Appl. No.: 12/291,754

(22) Filed: Nov. 12, 2008

(65) Prior Publication Data

US 2009/0138542 A1     May 28, 2009

(30) Foreign Application Priority Data

Nov. 22, 2007 (JP) ............................. P2007-303637
Aug. 18, 2008 (JP) ............................. P2008-210019

(51) Int. Cl.
*G06F 15/173* (2006.01)
*G06F 13/38* (2006.01)

(52) U.S. Cl.
CPC ................................. *G06F 13/387* (2013.01)
USPC .......................................................... 709/225

(58) Field of Classification Search
CPC .................................................. G06F 13/387
USPC ............................................................ 709/225
See application file for complete search history.

(56) References Cited

U.S. PATENT DOCUMENTS

2007/0027967 A1*   2/2007   Hatayama et al. ............ 709/220
2007/0044098 A1    2/2007   Ishimura et al.
2007/0093914 A1    4/2007   Sakai et al.

FOREIGN PATENT DOCUMENTS

| JP | 11177919 | | 7/1999 |
|---|---|---|---|
| JP | 2002073436 | A | 3/2002 |
| JP | 2002-149516 | A | 5/2002 |
| JP | 2003006133 | A | 1/2003 |
| JP | 2005117448 | A | 4/2005 |
| JP | 2005157419 | A | 6/2005 |
| JP | 2005346188 | A | 12/2005 |

(Continued)

OTHER PUBLICATIONS

English Translation of Japanese Office Action issued on Nov. 24, 2009 issued in Japanese Patent Application No. 2008-210019.

(Continued)

*Primary Examiner* — Maceeh Anwari
(74) *Attorney, Agent, or Firm* — Lerner, David, Littenberg, Krumholz & Mentlik, LLP

(57) ABSTRACT

There is provided an information processing apparatus including: a receiving section that receives function information about one or more functions from an external device connected via a network; a display section that displays a list of the functions of the external device, the functions being included in the function information; a selected-information acquiring section that acquires selected information pertaining to a function selected by a user from the list of the functions displayed by the display section; and a coordinate function executing section that causes the external device to execute the function selected by the user. Such a configuration provides the information processing apparatus designed such that even if the information processing apparatus and the external device do not have information about each other, the function of the external device can be executed by operating the information processing apparatus.

10 Claims, 11 Drawing Sheets

(56) References Cited

FOREIGN PATENT DOCUMENTS

| JP | 2006094211 A | 4/2006 |
|---|---|---|
| JP | 2006139429 A | 6/2006 |
| JP | 2006246531 A | 9/2006 |
| JP | 2006-319960 A | 11/2006 |
| JP | 2007-052691 A | 3/2007 |
| JP | 2007-052692 A | 3/2007 |
| JP | 2007052594 A | 3/2007 |
| JP | 2007124534 A | 5/2007 |
| JP | 2007133796 A | 5/2007 |
| WO | 99-07114 A1 | 2/1999 |
| WO | 2005072002 A1 | 8/2005 |
| WO | 2005073450 A1 | 8/2005 |

OTHER PUBLICATIONS

Yoshio, "DCM" of the essence of HAVI exceeds IEEE1394, Nikkei Electronics, Oct. 4, 1999, Nikkei BP, Oct. 4, 1999, vol. 753, p. 185-186.

Office Action from Japanese Application No. 2008-210019, dated Jul. 27, 2010.

Office Action from Japanese Application No. 2008-287513, dated Oct. 25, 2011.

Office Action from Japanese Application No. 2008-287513, dated Jun. 19, 2012.

Office Action from Japanese Application No. 2012-205517, dated Aug. 13, 2013.

Office Action from Japanese Application No. 2012-205517, dated Oct. 22, 2013.

* cited by examiner

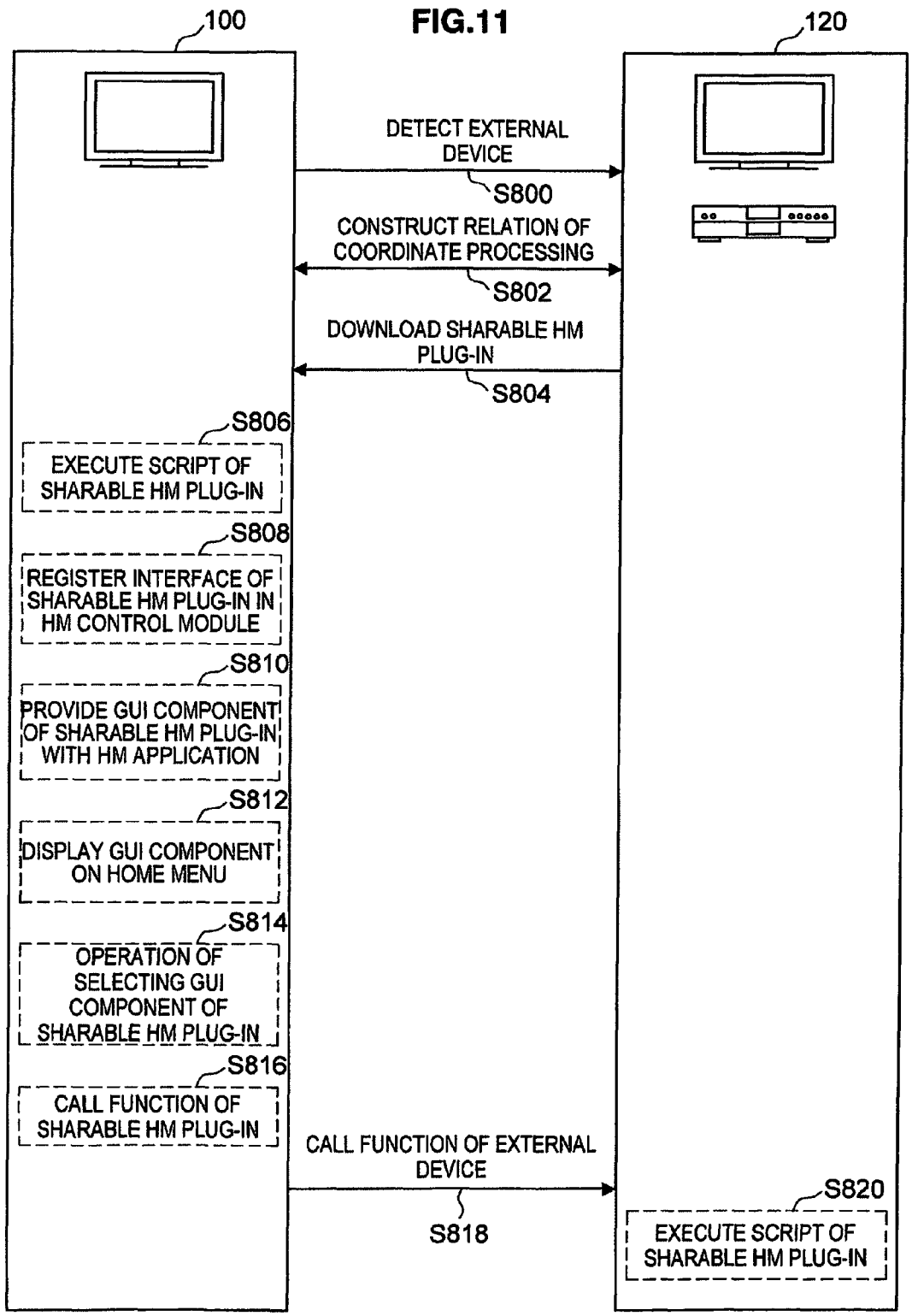

INFORMATION PROCESSING APPARATUS AND INFORMATION PROCESSING METHOD

CROSS-REFERENCE TO RELATED APPLICATION

The present application claims priority from Japanese Patent Application Nos. JP 2007-303637 and JP 2008-210019 filed in the Japanese Patent Office on Nov. 22, 2007 and Aug. 18, 2008, respectively, the entire contents of which are incorporated herein by reference.

BACKGROUND OF THE INVENTION

1. Field of the Invention

The present invention relates to an information processing apparatus and an information processing method.

2. Description of the Related Art

Various systems have been devised for coordinating devices connected to a home network installed in a house or for remote-controlling these devices. For example, one such system automatically decreases the volume of a television when there is a telephone call, by coordinating the television and the land-line telephone.

Japanese Patent Application Laid-Open No. 2006-319960 discloses a system for coordinating the devices within a home network by allowing a home server connected to the home network to handle information about coordination between the devices or information about coordinate control. In this system, the home server stores information about each of the devices and information about, e.g., the content of operations performable by at least two of the devices in coordination with each other; and the devices connected to the home network are associated with one another based on this information, thereby coordinating them.

SUMMARY OF THE INVENTION

However, the system in Japanese Patent Application Laid-Open No. 2006-319960 requires a home server for coordinating the devices. Accordingly, if there is no home server or there is no information about the devices to be coordinated by the home server, it is difficult to achieve such coordination.

Where each device has information about the other devices for coordination, and the devices are used in coordination with each other without a server, it may arise that, if the information about one of the devices is updated due to replacement with a new one, the other device may not have the updated information, making it difficult to coordinate them. Alternatively, an additional updating means may be required for updating information stored in old devices that pertains to other devices.

The present invention has been proposed in view of the foregoing issues. It is desirable to provide information processing apparatuses and methods, thereby enabling coordination between devices with no dependence on the devices themselves.

According to a first embodiment of the present invention, there is provided an information processing apparatus including: a receiving section that receives function information about one or more functions from an external device connected via a network; a display section that displays a list of the functions of the external device, the functions being included in the function information; a selected-information acquiring section that acquires selected information pertaining to a function selected by a user from the list of the functions displayed by the display section; and a coordinate function executing section that causes the external device to execute the function selected by the user.

In such a configuration, even if devices do not have information about each other in advance when the devices are coordinated, one of the devices shows information about the functions of the other device, and the device displaying the information is operated to execute the function of the other device.

The function information may include identification information corresponding to each of the functions, and the coordinate function executing section may transmit the identification information corresponding to the function selected by the user to the external device. Thus, the display side device simply displays a list of functions and informs the other device of the function selected from the list. This makes the burden of the coordinate process less.

The function information may include information about a place from which a program corresponding to each of the functions is acquired, and the coordinate function executing section may acquire the program from the place corresponding to the function selected by the user and run the program. This enables the display side device to operate a more complicated process for another device.

In addition, the function information may include a script type execution module that controls the process of remotely calling up each of the functions, and the coordinate function executing section may execute the execution module, remotely call up from the external device the function selected by the user, and cause the external device to execute the selected function. Thus, using the script type execution module in order to control the process of remotely calling up each of the functions makes it possible to perform various forms of coordinate processing between the external devices.

Further, the receiving section may receive a function display request to display the list of the functions included in the function information, and, according to the function display request, the display section may display the list of the functions of the external device included in the function information.

According to a second embodiment of the present invention, there is provided an information processing apparatus including: a transmitting section that transmits function information about one or more functions to an external device connected via a network; and a coordinate function executing section that executes a function selected by a user of the external device from the functions included in the function information.

The function information may include identification information corresponding to each of the functions, the identification information corresponding to a function selected by a user from the functions included in the function information may be received from the external device, and the function corresponding to the identification information may be executed.

The function information may include information about a place from which a program corresponding to each of the functions is acquired, and the external device may run the program corresponding to the function selected by the user from the functions included in the function information, thereby executing the selected function.

In addition, the function information may include a script type execution module that controls the process of remotely calling up each of the functions. The external device executes the execution module, and the function included in the function information is remotely called from the external device, and thereby the coordinate function executing section may execute the selected function. Thus, using the script type execution module in order to control the process of remotely calling each of the function makes it possible to perform various forms of coordinate processing between the external devices.

The information processing apparatus may further include an external device searching section that searches the external device connected via the network, and the transmitting section may further transmit a function display request to display a list of the functions included in the function information.

According to the type of the external device searched by the external device searching section, the transmission section may select one or more functions included in the function information.

According to a third embodiment of the present invention, there is provided an information processing method including the steps of: receiving function information about one or more functions from an external device connected via a network; displaying a list of the functions of the external device, the functions being included in the function information; receiving information pertaining to a function selected by a user from the list of the functions displayed in the displaying step; and causing the external device to execute the function selected by the user.

According to the embodiments of the present invention described above, coordination between devices with no dependence on the devices themselves can be realized.

BRIEF DESCRIPTION OF THE DRAWINGS

FIG. 11 is a diagram showing a sequence of the coordinate processing performed by the home network system that has the function configuration shown in FIG. 10.

DETAILED DESCRIPTION OF THE PREFERRED EMBODIMENTS

Figure 1:
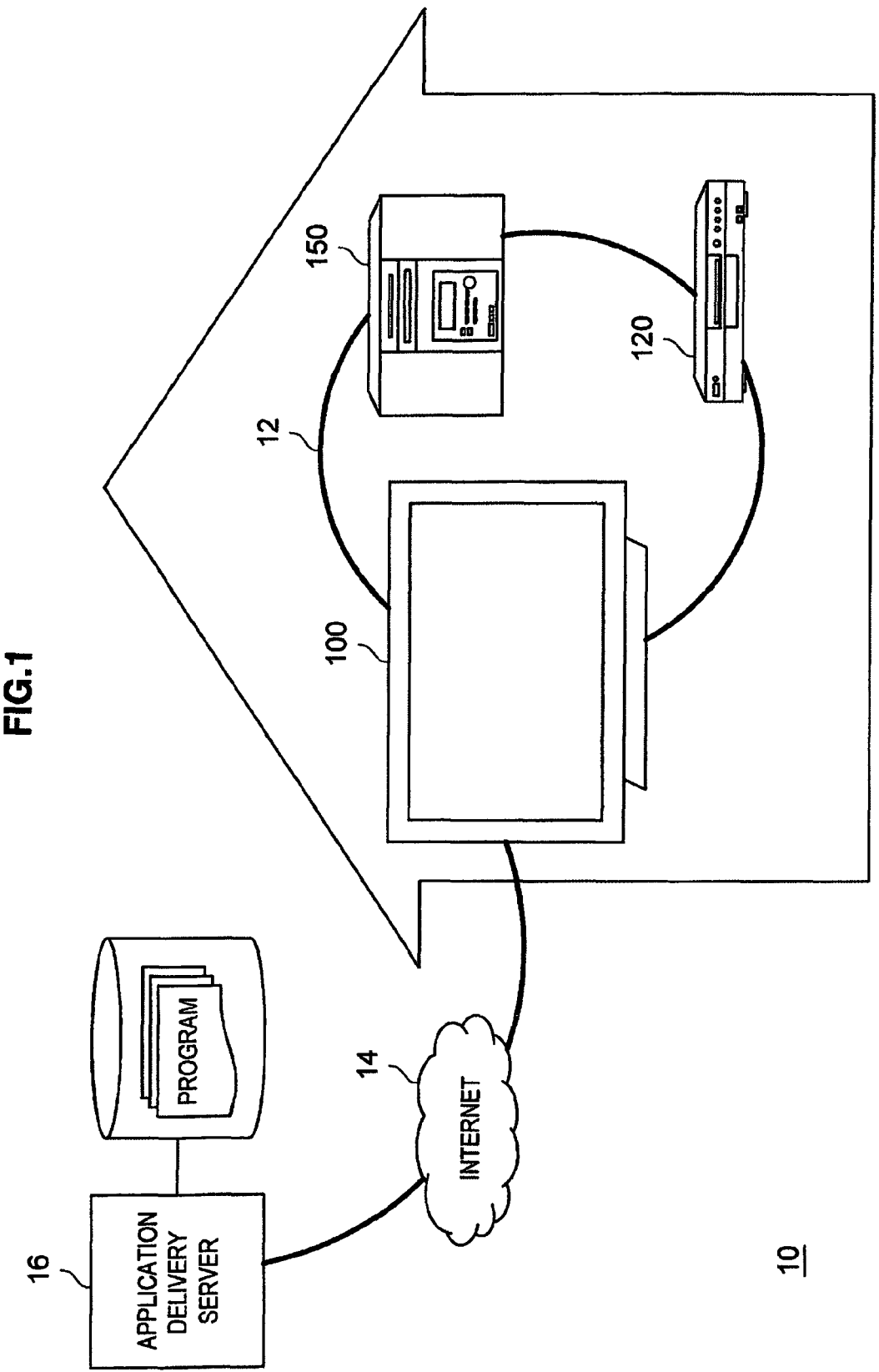
FIG. 1 is a diagram showing a configuration of a home network system according to a first embodiment of the present invention.

Hereafter, preferred embodiments of the present invention will be described in detail with reference to the appended drawings. Note that in this specification and the appended drawings, structural elements that have substantially the same functions and structures are denoted with the same reference numerals and a repeated explanation of these structural elements is omitted.

<First Embodiment>

First, a home network system according to the first embodiment of the present invention will be described with reference to FIG. 1. FIG. 1 is a diagram schematically showing the configuration of a home network system 10 according to the first embodiment.

As shown in FIG. 1, the home network system 10 according to the first embodiment includes devices such as a television receiver 100 connected to a home network 12 installed such as in a house, a digital recorder 120, and an audio device 150. Here, the television receiver 100 and digital recorder 120 are examples of an information processing apparatus and external device according to the present invention.

In the embodiments below, a description is given of the case where the television receiver and digital recorder exemplify an information processing apparatus that performs coordinate processing. However, the present invention is not limited thereto, and the information processing apparatus and external device may be, e.g., an audio device, home-use game machine, cellular phone, camera, or video camera.

The television receiver 100 receives the program contents of TV programs, broadcast by broadcasting stations, via a receiving antenna installed outdoors, or a video delivery IP (Internet Protocol) net, and outputs the program contents. The television receiver 100 includes a display for displaying videos and a speaker for outputting audio, thereby converting the data of received program contents into a video and audio and outputting the data using the display and speaker.

The television receiver 100 is connected to devices, e.g., the digital recorder 120 via the home network 12. In addition, using UPnP (Universal Plug and Play), Multicast DNS (Domain Name System), or the like, the television receiver 100 searches devices within the home network 12 and directly communicates with the devices. For example, the television receiver 100 obtains the IP address of the digital recorder 120, acquires information about the function of the digital recorder 120 and information for setting it, or informs another apparatus of information about the function of the television receiver 100 itself, setting information for itself, etc.

Further, the television receiver 100 is connected to the Internet 14, and has the function of downloading an application from an application delivery server 16 on the Internet 14 and executing the application.

The digital recorder 120 receives, via a receiving antenna or a video delivery IP net, the program contents of a TV program broadcast by a broadcasting station, records the program contents onto a storage medium such as a DVD or HDD, or reproduces the contents recorded in the storage medium. As with the television receiver 100, the digital recorder 120 is also connected to the home network 12, and is capable of directly communicating with the television receiver 100, etc., via the home network 12.

(Configuration of Television Receiver 100)

Figure 2:
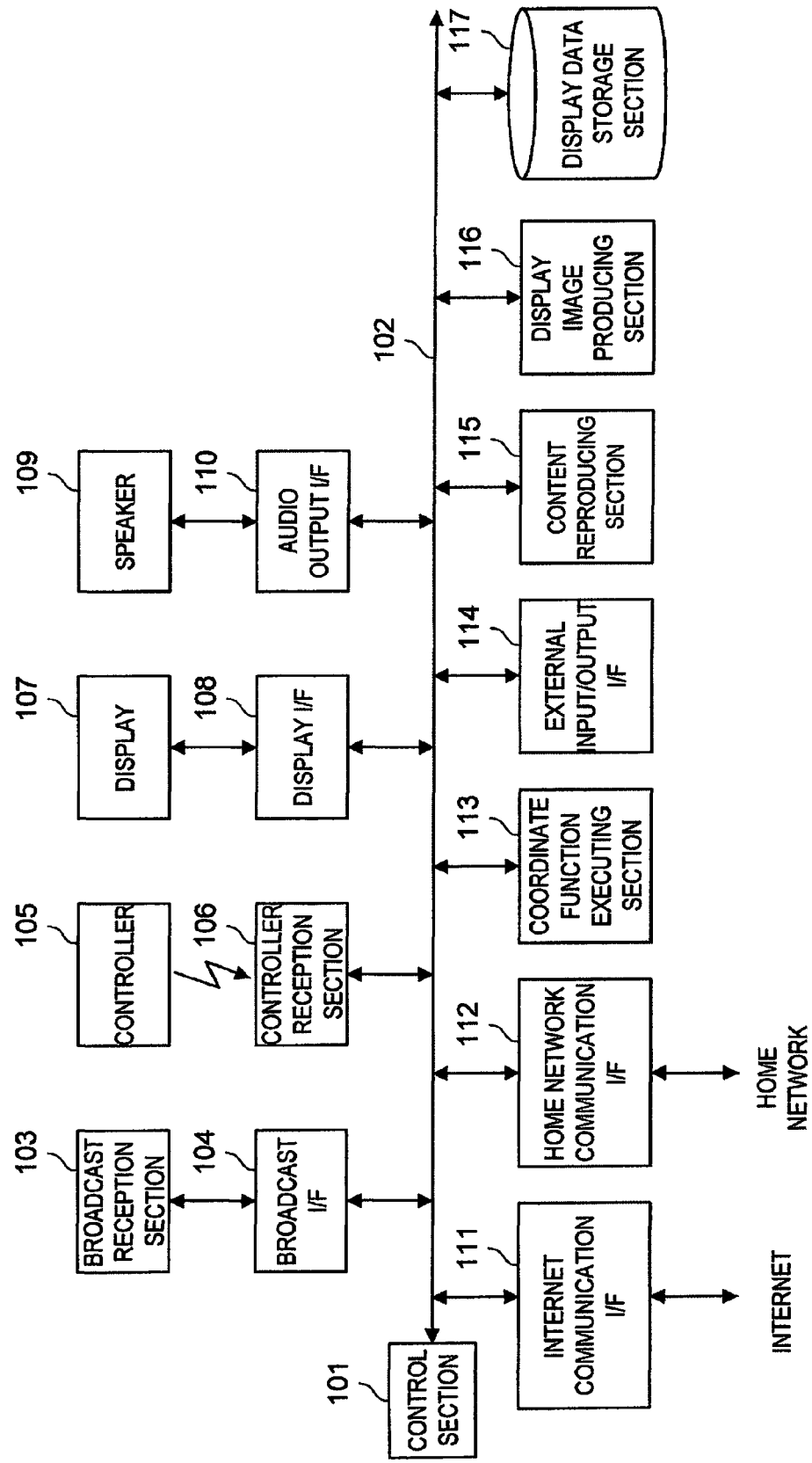
FIG. 2 is a block diagram schematically showing a configuration of a television receiver.

Next, the configuration of the television receiver 100 will be described with reference to FIG. 2. FIG. 2 is a block diagram schematically showing the configuration of the television receiver 100. As shown in FIG. 2, the television receiver 100 includes a control section 101, broadcast reception section 103, broadcast interface (I/F) 104, controller reception section 106, display 107, display interface (I/F) 108, speaker 109, audio output interface (I/F) 110, internet communication interface (I/F) 111, home network communication interface (I/F) 112, coordinate function executing section 113, external input/output interface (I/F) 114, content reproducing section 115, display image producing section 116, and display data storage section 117. Each of the above-mentioned components of the television receiver 100 will now be described.

The control section 101 serves as a functional section connected to each of the other functional sections via a connection bus 102 and executing the function of the television receiver 100 while controlling each of the functional sections. For example, the control section 101 exerts control such that the content reproducing section 115 and display image producing section 116 convert the data of a program contents received by the broadcast reception section 103 into a display image and then the display image is shown on the display 107. Alternatively, in response to a request signal received by the controller reception section 106, the control section 101 controls the other functional sections so as to perform a process corresponding to the request signal.

The broadcast reception section 103 receives the program contents via the receiving antenna or video delivery IP net, and transmits the program contents to the connection bus 102 via the broadcast interface 104. The controller reception section 106 receives a command signal transmitted by, e.g., an infrared ray from a controller 105 operated by a user. The command signal received is transmitted to the control section 101 via the connection bus 102.

The display 107 is a display device for displaying an image such as program contents produced by the display image producing section 116. The display 107 receives and displays the display image input via the display interface 108. The speaker 109 is an audio output device, and outputs audio input via the audio output interface 110.

The internet communication interface 111 is an interface for communicating with the application delivery server 16 via the Internet 14. According to instructions from the control section 101, the internet communication interface 111 connects to the application delivery server 16 via a specified URL, and downloads the corresponding application program.

The home network communication interface 112 is connected to the home network 12, and communicates with other devices (e.g., the digital recorder 120) connected to the home network 12. The home network communication interface 112 transfers data received from an external device such as the digital recorder 120 on the home network 12, to the control section 101, and transmits data input from the control section 101, to the external device via the home network 12.

The coordinate function executing section 113 performs a process so that among coordinate functions displayed on the display 107 when a function display request is received from an external device within the home network 12, a function selected by a user is executed by the external device making the request. Specifically, the coordinate function executing section 113 informs the external device of the function selected by a user (in the case of Embedded type, which is described below) or downloads from the application delivery server 16 on the internet 14 an application program corresponding to the selected function and executes this program (in the case of Download type, which is described below).

The external input/output interface 114 is an interface for connecting the television receiver 100 and a device, for example, the digital recorder 120, a digital video camera, or the like. The external input/output interface 114 inputs any video and audio output by the digital recorder 120, digital video camera, or the like, or externally outputs video, etc., received by the television receiver 100.

The content reproducing section 115 reproduces a program contents received by the broadcast reception section 103 as a video. The content reproducing section 115 separates a packet of program contents received by the broadcast reception section 103 via, e.g., the video delivery IP net, into various signals corresponding to audio, video, data, etc., then decodes the separate signals, and inputs the decoded signals into the display image producing section 116, etc.

The display image producing section 116 receives the video signal and data signal decoded by the content reproducing section 115 and also displays data or the like stored in the display data storage section 117, and produces a display image to be displayed on the display 107. The display data storage section 117 is a memory section for storing display data such as various icons and characters displayed on the display 107. Function display data and the like received from an external device on the home network 12 through the home network communication interface 112 is also stored in the display data storage section 117.

(Configuration of Digital Recorder 120)

Figure 3:
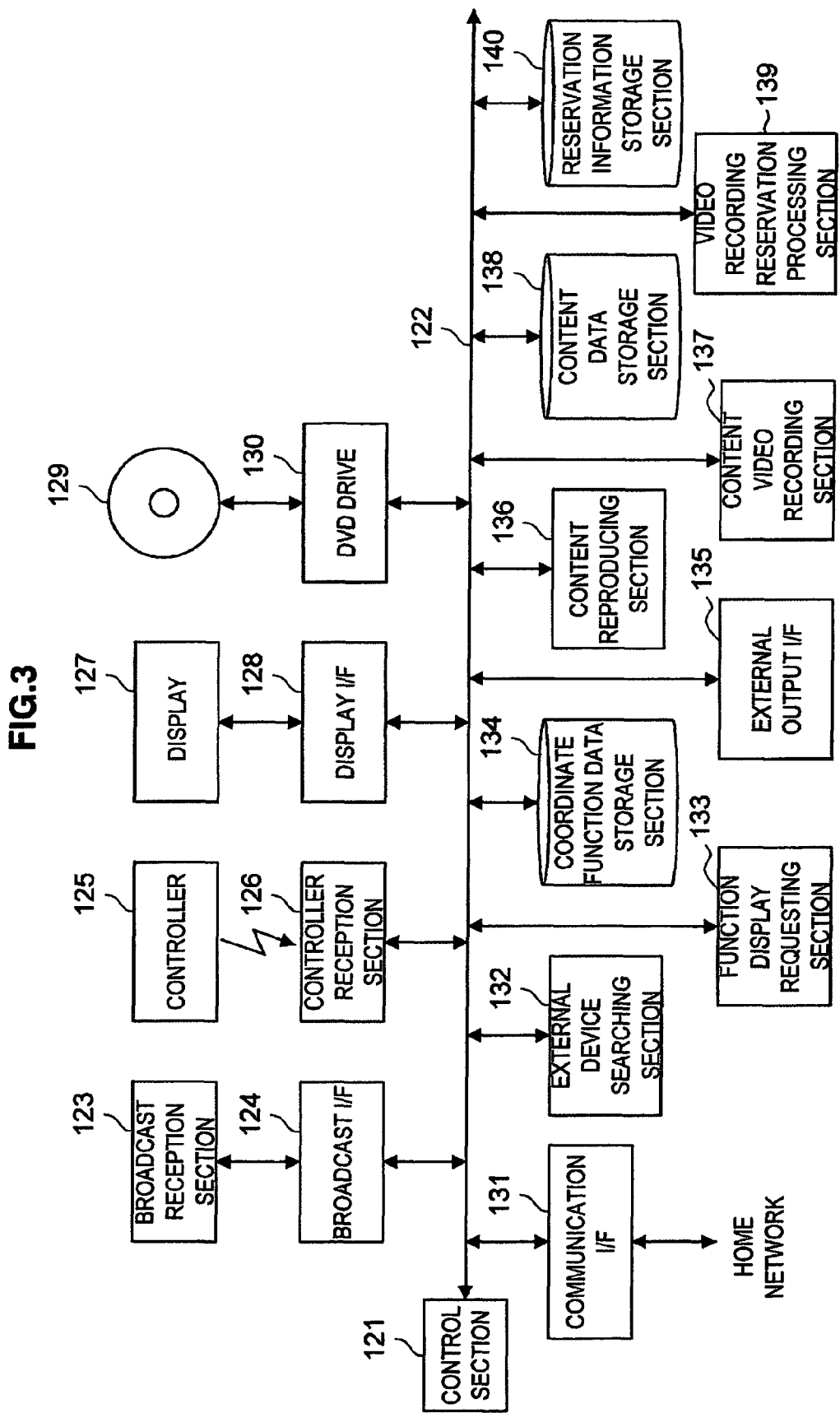
FIG. 3 is a block diagram schematically showing a configuration of a digital recorder.

In the foregoing, the description was given of the configuration of the television receiver 100. Next, the configuration of digital recorder 120 will be described with reference to FIG. 3. FIG. 3 is a block diagram schematically showing the configuration of the digital recorder 120. As shown in FIG. 3, the digital recorder 120 includes a control section 121, broadcast reception section 123, broadcast interface (I/F) 124, controller reception section 126, display 127, display interface (I/F) 128, DVD drive 130, communication interface (I/F) 131, external device searching section 132, function display requesting section 133, coordinate function data storage section 134, external output interface (I/F) 135, content reproducing section 136, content video recording section 137, content data storage section 138, video recording reservation processing section 139, and reservation information storage section 140. Each of the above-mentioned components of the digital recorder 120 will now be described.

The control section 121, broadcast reception section 123, broadcast interface 124, controller reception section 126, display 127, and display interface 128 are identical in terms of function to those in the television receiver 100 described above, and repeated description thereof will be omitted here.

The DVD drive 130 records data onto the DVD 129 and reads data recorded on the DVD 129. The read data is supplied to the content reproducing section 136 by the control section 121, and is output from the external output interface 135 to an external display device, e.g., the television receiver 100.

The communication interface 131 is connected to the home network 12, and communicates with other devices such as the television receiver 100 connected to the home network 12. Using the UPnP (Universal Plug and Play), Multicast DNS, or the like, via the communication interface 131, the external device searching section 132 searches such devices within the home network 12 and informs the control section 121, etc., of information about the searched devices, e.g., the IP address of the device.

The function display requesting section 133 transmits a function display request, via the communication interface 131, to the devices within the home network 12, searched by the external device searching section 132. The functional display request requests that the external device is informed of the functions (reproduction, recording, recording reservation, checking of reserved information, etc.) of the digital recorder 120 and these functions are listed on the display or the like of the external device.

The coordinate function data storage section 134 stores information (i.e., coordinate function data) about any function of which the external device can be informed by the function display requesting section 133. Functions of which the external device can be informed vary according to type (for example) of the external device. Accordingly, the coordinate function data is stored so as to correspond to the type of each external device. From the coordinate function data storage section 134, the function display requesting section 133 acquires the coordinate function data corresponding to the external device searched by the external device searching section 132, and transmits the coordinate function data to the target external device through communication interface 131.

The coordinate function data stored in the coordinate function data storage section 134 includes information about the type of each external device and information about functions that need to be displayed on the external device. Examples of the information about each device type include the device type name and the device type category (e.g., digital recorder, game machine, audio device, cellular phone, and camera). Information about each function includes, e.g., the function name (e.g., reproduction, recording, recording reservation, checking of reservation information), the function category (e.g., application, settings), the function ID, and behavior information about the function. Behavior information about the function refers to information used to specify the operation method when the external device selects the function. There are two types of behavior information: one is the above-mentioned Embedded type for informing only information (e.g. function ID) indicating the selected function, and the other, the above-mentioned Download type for downloading and running an application program corresponding to the selected function. In the case of Download type, an URL or the like specifying address from which the application program is acquired is included as behavior information.

The external output interface 135 is an interface for outputting the display image or audio, reproduced by the content reproducing section 136, to a display device, e.g., television receiver 100. The content reproducing section 136 performs data conversion for reproducing content data recorded on DVD 129 loaded by the DVD drive 130 or content data storage section 138, an encoding or decoding process, and so on.

The content video recording section 137 performs data conversion for program content data received by the broadcast reception section 123, an encoding/decoding process, and so on so that the program content data is recorded on the content data storage section 138 or on the DVD 129 loaded by the DVD drive 130. The content data storage section 138 is a recording medium mainly composed of a hard disk and includes a memory section for storing any program contents received by the broadcast reception section 123.

The video recording reservation processing section 139 is a functional section for registering information for making a reservation for a video recording process to be performed by the content video recording section 137. The video recording processing section 139 receives information about a program reservation input from the controller reception section 126 by a user manipulating the controller 125, and stores the information into the reservation information storage section 140. The reservation information storage section 140 stores program reservation information, such as a channel number, the time to start/finish video recording, and the program name, stored by the video recording reservation processing section 139.

The foregoing is a description of the configuration of the digital recorder 120.

(Process of Coordination Between Television Image Receiver 100 and Digital Recorder 120)

Figure 4:
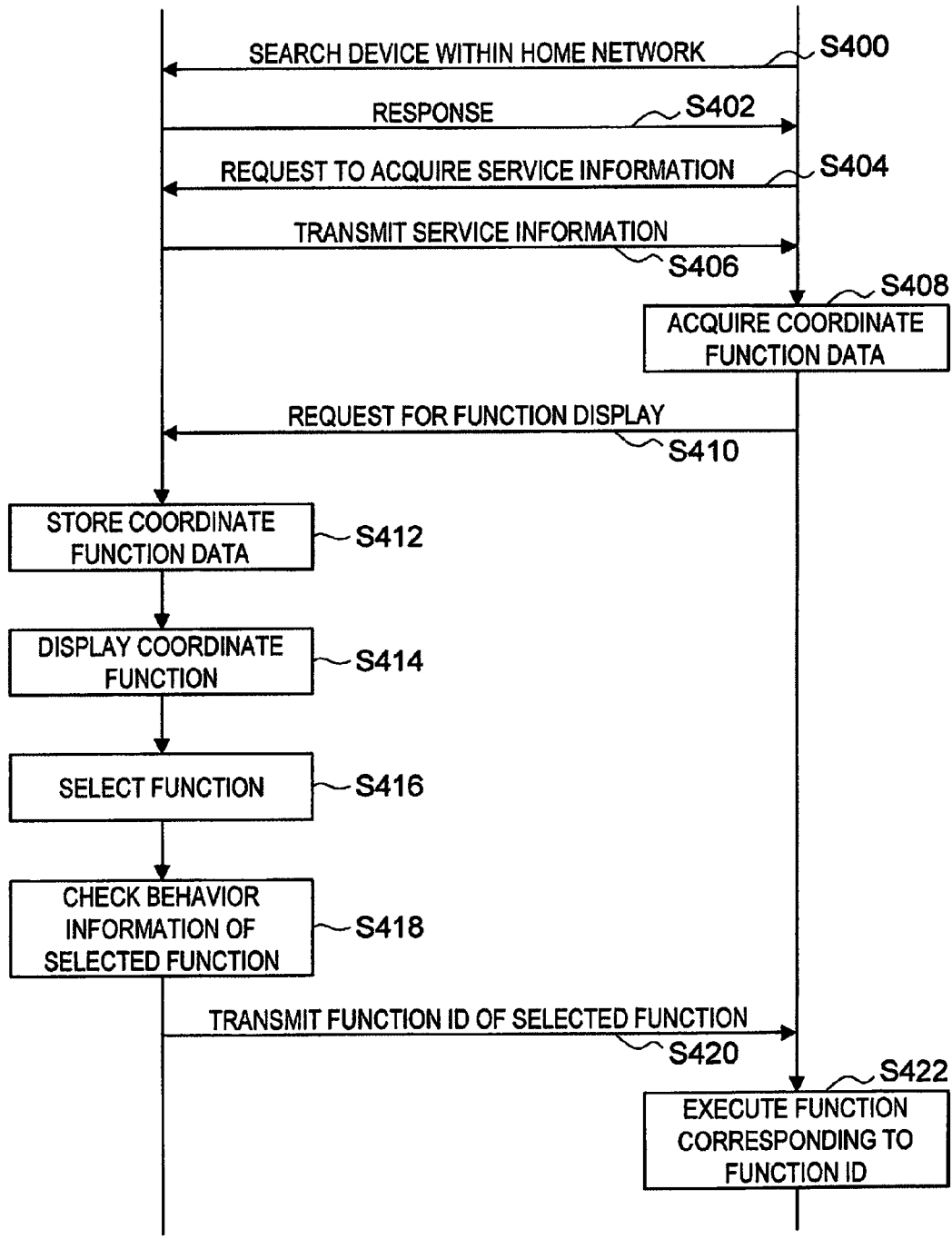
FIG. 4 is a diagram illustrating a sequence for a coordination process performed in the home network system according to a first example of the first embodiment.
Figure 6:
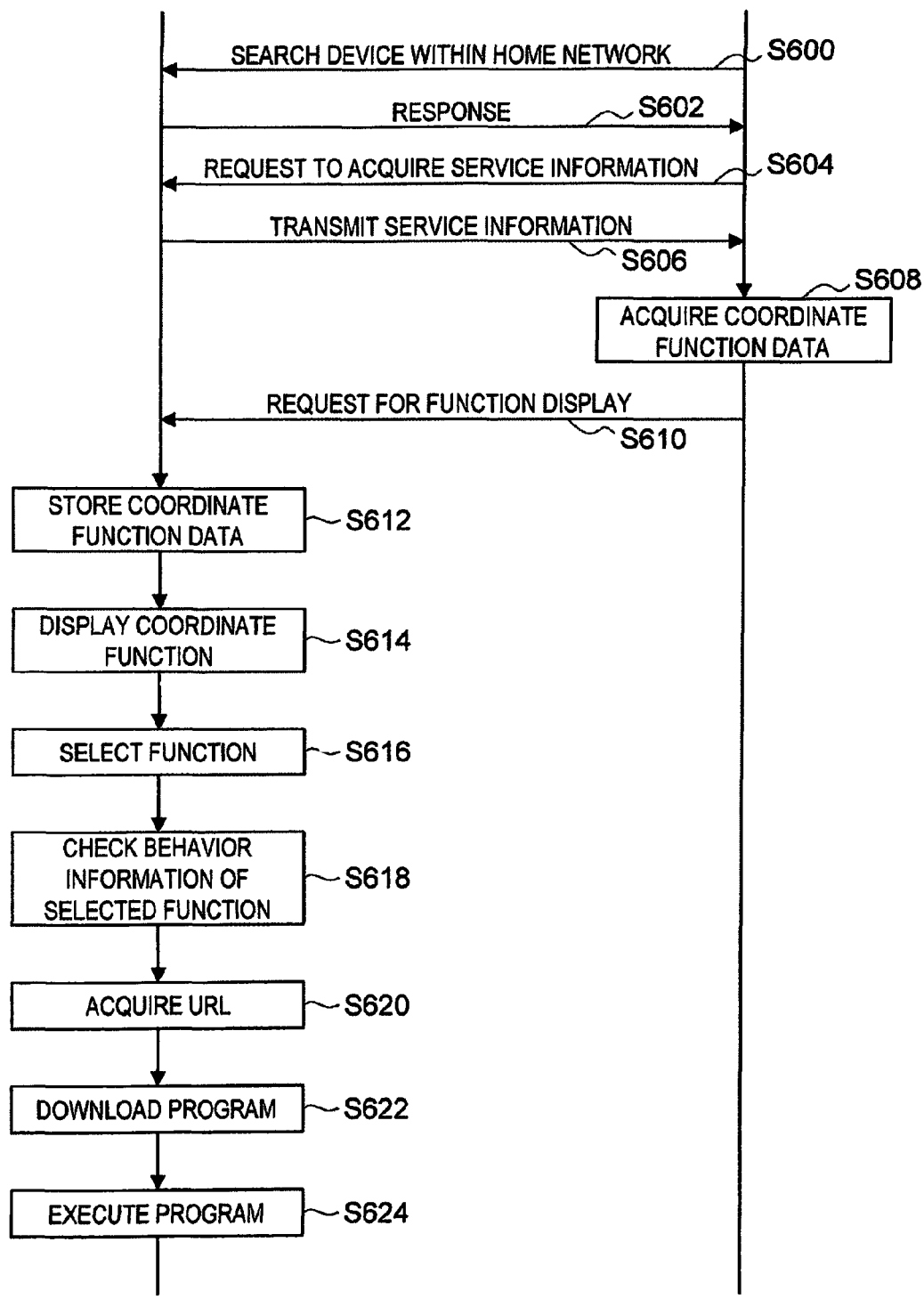
FIG. 6 is a diagram illustrating a sequence for the coordination process performed by a home network system according to a second example of the first embodiment.

Next, the coordination processes performed by the television receiver 100 and the digital recorder 120 according to the present embodiment will be described with reference to FIGS. 4 and 6. FIG. 4 is a diagram illustrating a sequence for a first example of the first embodiment of the coordination process performed in the home network system 10 according to the embodiment. FIG. 6 is a diagram illustrating a sequence for a second example of the second embodiment of the coordination process performed by a home network system 10 according to the embodiment.

FIRST EXAMPLE

First, a first example of a coordination process between a television receiver 100 and a digital recorder 120 according to the embodiment will be described with reference to FIG. 4. In the first example, a description will be given exemplifying the case where the function of the digital recorder 120 selected by the television receiver 100 is Embedded type.

Using the UPnP (universal Plug and Play), Multicast DNS, or the like, the external device searching section 132 of the digital recorder 120 searches a device within the home network system 12 first (step S400). Next, the television receiver 100 responds to an enquiry from the digital recorder 120 (step S402).

The digital recorder 120 requests the device (i.e., television receiver 100), which has responded, to acquire service information (step S404). The service information refers to information about a service offered by the device in coordination with the external device. Checking the service information makes it possible to check functions that can be performed by coordination between two or more devices. The television receiver 100 transmits service information to the effect that the television receiver 100 has the function of displaying the functions of the external device to the digital recorder 120 (step S406).

From the service information received from the television receiver 100 in step S406, the function display requesting section 133 of the digital recorder 120 determines that the television receiver 100 is a device capable of displaying the functions of the external device; and from the coordinate function data storage section 134, the function display requesting section 133 acquires coordinate function data corresponding to the television receiver 100 (step S408). Subsequently, the digital recorder 120 transmits a function display request to the television receiver 100 together with the coordinate function data acquired in step S408 (step S410).

The television receiver 100 receives the function display request from the digital recorder 120 via the home network communication interface 112, and stores the coordinate function data into the display data storage section 117 (step S412). Next, based on the coordinate function data received from the digital recorder 120, the display image producing section 116 of the television receiver 100 produces a display image to be displayed on the display 107, and outputs the display image on the display 107 via the display interface 108 (step S414).

Figure 5:
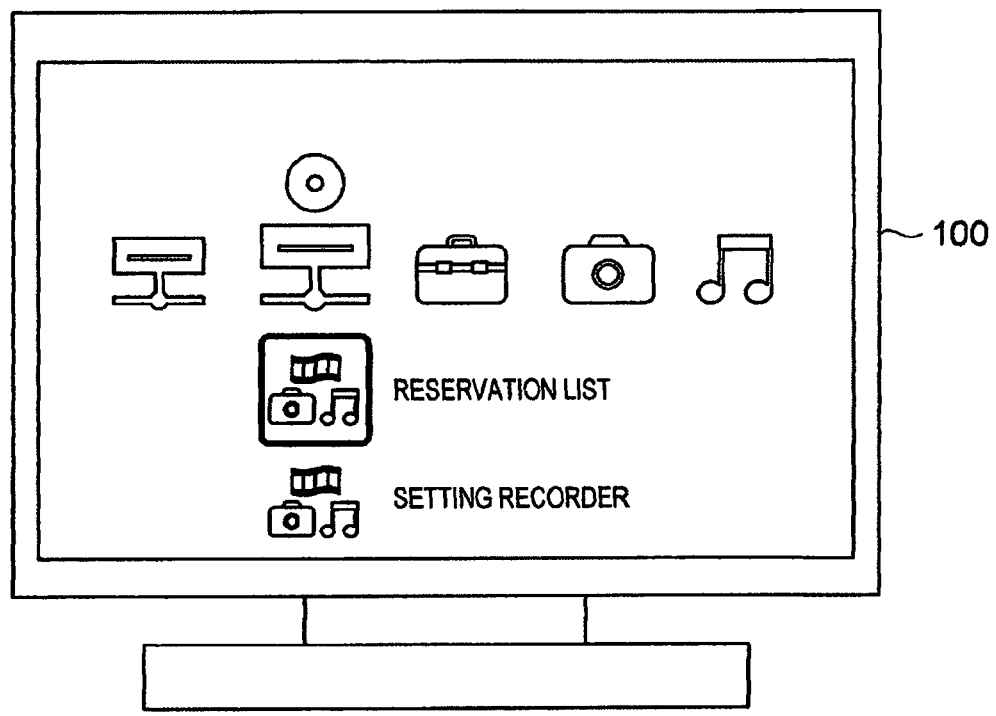
FIG. 5 is a diagram showing an example of a function display screen displayed on the television receiver.

FIG. 5 is a diagram showing an example of a display screen displayed on the display 107 in step S414. In the example in FIG. 5, a list of coordinate functions represented by icons is displayed, and each icon represents a device usable in coordination and the function of the device. FIG. 5 exemplifies the case where the function of "reservation list" and the function of "setting recorder" of the digital recorder 120 are displayed. Here, each of the displayed icons can be selected by operating the controller 105. The example in FIG. 5 shows a screen on which the function of the digital recorder, the function of "reservation list," has been selected.

In this case, a user operates the controller 105, thereby selecting one of the functions displayed on the display 107 and inputting the selected one into the controller reception section 106 (step S416). The coordinate function executing section 113 of the television receiver 100 receives a value received by the controller reception section 106, and acquires the behavior information about the function from the coordinate function data stored in the display data storage section 117, and checks whether the selected function is Embedded or Download type (step S418). In the first example of the first embodiment, a description has been given assuming that the selected function is Embedded type.

Since the selected function for the coordinate function executing section 113 is Embedded type, the function ID of the selected function is acquired from the coordinate function data and is transmitted to the digital recorder 120 (step S420). Then, the digital recorder 120 executes a function such as displaying a reservation list or altering setting information) corresponding to the function ID received from the television receiver 100 (step S422).

According to the coordinate method of the example, even if devices do not have information about each other in advance, the display of one of the devices shows information about the other devices, and one of the functions of the other device may be selected and executed using the remote controller or the like of the one device showing this information. Thus, using the display screen and remote controller of one device, another device can be controlled.

SECOND EXAMPLE

Next, a coordinating process between a television receiver 100 with a digital recorder 120 according to a second example of the embodiment will be described with reference to FIG. 6. In the second example, a case where the function of the digital recorder 120 selected by the television receiver 100 is Download type will be described. The process from step S600 to step S616 in FIG. 6 is substantially identical to that from step S400 to step S416 in the first example described above, and repeated description thereof will be omitted here. The process from step S618 will be described below.

In step S618, as in step S418 in the first example, the coordinate function executing section 113 of the television receiver 100 uses behavior information about a function selected through an operation performed by a user to check whether the function is Embedded or Download type. In the second example, the selected function is assumed to be Download type, and the coordinate function executing section 113, therefore, acquires any URL included in the behavior information (step S620).

Subsequently, the television receiver 100 accesses the URL acquired in step S620 via the internet communication interface 111, and downloads a program (step S622). Next, the coordinate function executing section 113 runs the downloaded program so that a corresponding function is executed in the digital recorder 120 (step S624). After running the program, the coordinate function executing section 113 may delete the data about the downloaded program.

In the first example, the television receiver 100 simply transmits the ID of a selected function to the digital recorder 120, and the subsequent processes are performed by the digital recorder 120. In the second example, on the other hand, the television receiver 100 itself runs the program corresponding to a selected function, thereby carrying out the function of the digital recorder 120.

For example, if the function of "setting recorder" is selected from the digital recorder functions displayed on the television receiver 100, the television receiver 100 downloads and runs a program for "setting recorder." The program communicates with the digital recorder 120 via the home network communication interface 112, reads setting information for the digital recorder 120, and displays the setting information on the display 107 of the television receiver 100.

Accordingly, while viewing the display 107 of the television receiver 100, a user can check the setting information for the digital recorder 120 or change any set value by operating the controller 105 of the television receiver 100. Thus, the coordinate method according to the second example enables one device to perform a more complicated operation for another device.

<Second Embodiment>

Figure 7:
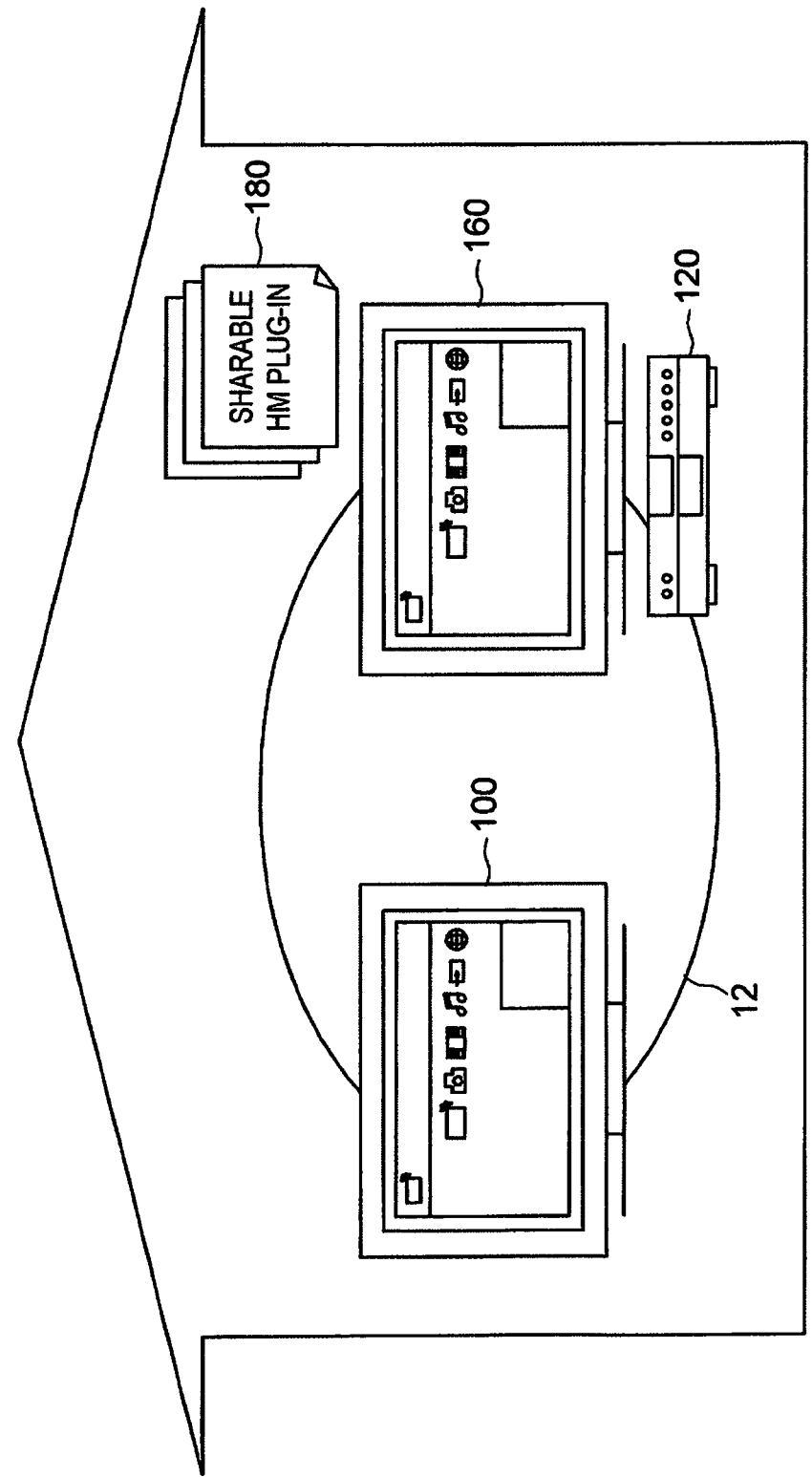
FIG. 7 is a diagram showing a configuration of a home network system according to a second embodiment of the present invention.

Referring to FIG. 7, a system according to the second embodiment of the present invention will now be described. FIG. 7 is a diagram showing the configuration of a home network system according to the second embodiment. As shown in FIG. 7, the system according to the second embodiment, as in the first embodiment, includes a television receiver 100, a digital recorder 120, and the like, which are connected to a home network 12.

In the television receiver 100 and digital recorder 120, a home menu (HM) application for providing a user a common menu environment for use as a home menu (hereinafter, also referred to as "HM") is operated. In the digital recorder 120, a module (hereinafter referred to as "sharable HM plug-in 180) for providing a recording/reproducing function operates together with the HM application. The home menu of the digital recorder 120 is displayed on, e.g., the screen of a display 160 connected to the digital recorder 120. The sharable HM plug-in 180 is incorporated as a module scripted in a script language such as Java (registered trademark) Script.

The configurations of the television receiver 100 and digital recorder 120 are identical to the television receiver 100 and digital recorder 120 in the first embodiment except that a script execution environment is provided, and the description of those will not be described in detail herein.

[Function Configuration of Devices]

Figure 8:
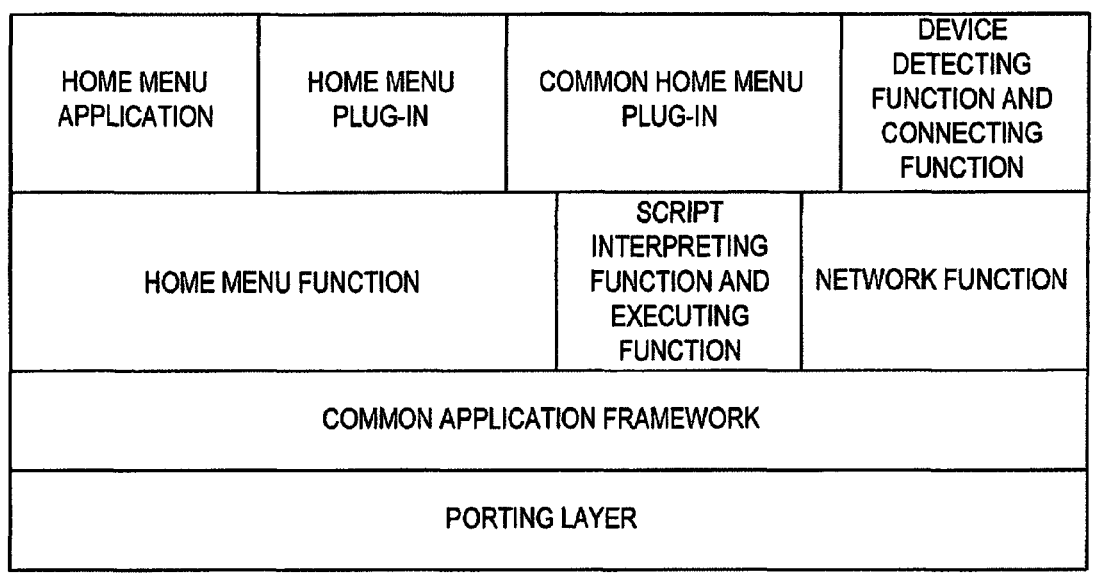
FIG. 8 is a diagram showing a function configuration of a television receiver and digital recorder according to the second embodiment.

First, the configuration of the function of the television receiver 100 and digital recorder 120 will be described with reference to FIG. 8. FIG. 8 is a diagram showing the function configuration of the television receiver 100 and digital recorder 120 according to the second embodiment. The television receiver 100 and digital recorder 120 have function configuration in common to realize a common menu environment. As shown in FIG. 8, the function configuration has a hierarchical structure including the first to fourth hierarchies.

The first hierarchy is composed of a porting layer. Functions requiring alteration when the functions of the higher (second to fourth) hierarchies are ported between the devices of different specifications, are implemented in the first hierarchy.

The second hierarchy has a common application framework. A general-purpose function operating on devices of different specifications is implemented in the common application framework. The second hierarchy is separated from the porting layer of the first hierarchy. Accordingly, the common application framework and the functions of the higher hierarchies are operable on devices of different specifications by altering the porting layer.

An HM function, a script interpreting-and-executing function, and a network function are implemented in the third hierarchy.

The HM function is a platform for providing a home menu function by using the HM application, HM plug-in and sharable HM plug-in 180 composing the fourth hierarchy. The script interpreting-and-executing function interprets the script as of a module scripted in a script language, and executes a behavior specified by the script of the module. The network function is designed such that various functions operating on the common application framework are provided with the function of being able to access the home network 12.

The fourth hierarchy has the HM application, HM plug-in, and sharable HM plug-in 180, and a device detecting-and-connecting function.

The HM application provides a user with a common GUI (Graphic User Interface) menu environment as a home menu. The HM plug-in is a module such as a TV plug-in, DLNA (Digital Living Network Alliance) plug-in, or setting plug-in. The sharable HM plug-in 180 can be shared between the devices that have an application framework in common, such as the plug-in providing a recording/reproducing function.

The HM plug-in is a module (also called an "object code module") scripted in a machine language (i.e., object code) or script language (In a description below, it is assumed that the HM plug-in is composed as the object code module.). On the other hand, the sharable HM plug-in 180 is a module (also called a "script module") scripted in the script language.

The device detecting-and-connecting function detects other devices via the network function by use of a communication protocol, such as UPnP, Multicast DNS, and DNS-SD, and connects these devices if they have an application framework in common.

The HM function defines the interfaces for the HM application, HM plug-in and sharable HM plug-in 180. Thus, the HM application, HM plug-in, and sharable HM plug-in 180 can be configured so as to be independent of one another when implemented. The HM function itself is also configured so as to be independent of the HM application, HM plug-in, and sharable HM plug-in 180.

By implementing the interface defined by the HM function, the HM plug-in or sharable HM plug-in 180 is capable of interacting with the HM application via the HM function regardless of the method of implementation. Accordingly, using the HM plug-in or sharable HM plug-in 180 allows implementation of the script module function in addition to the object code module function.

As in the HM plug-in or sharable HM plug-in 180, an application such as the HM application can implement a script module function. Accordingly, the HM application can be configured as an HM application with a different GUI component and different behavior on devices of different specifications.

In this case, the HM application realizes, via the HM function, various functions such as the arrangement of the GUI objects on a menu screen and the remote procedure call (RPC) of the sharable HM plug-in 180. That is, the HM application is configured so as to be independent of the specific function implemented by a specific device when functions are implemented. Thus, each of the devices is capable of acquiring the HM application implemented by the script that is located on a home network 12 or an external network environment connected via the home network 12.

The sharable HM plug-in 180 connects the script module function with the interface functions defined by the HM function. The HM plug-in 180 is shared between the devices that have an application framework in common via the network function. The sharable HM plug-in 180 calls up, via the home network function, a function that can be executed at the place from which the plug-in is transmitted.

[Outline of Coordinate Processing]

Figure 9:
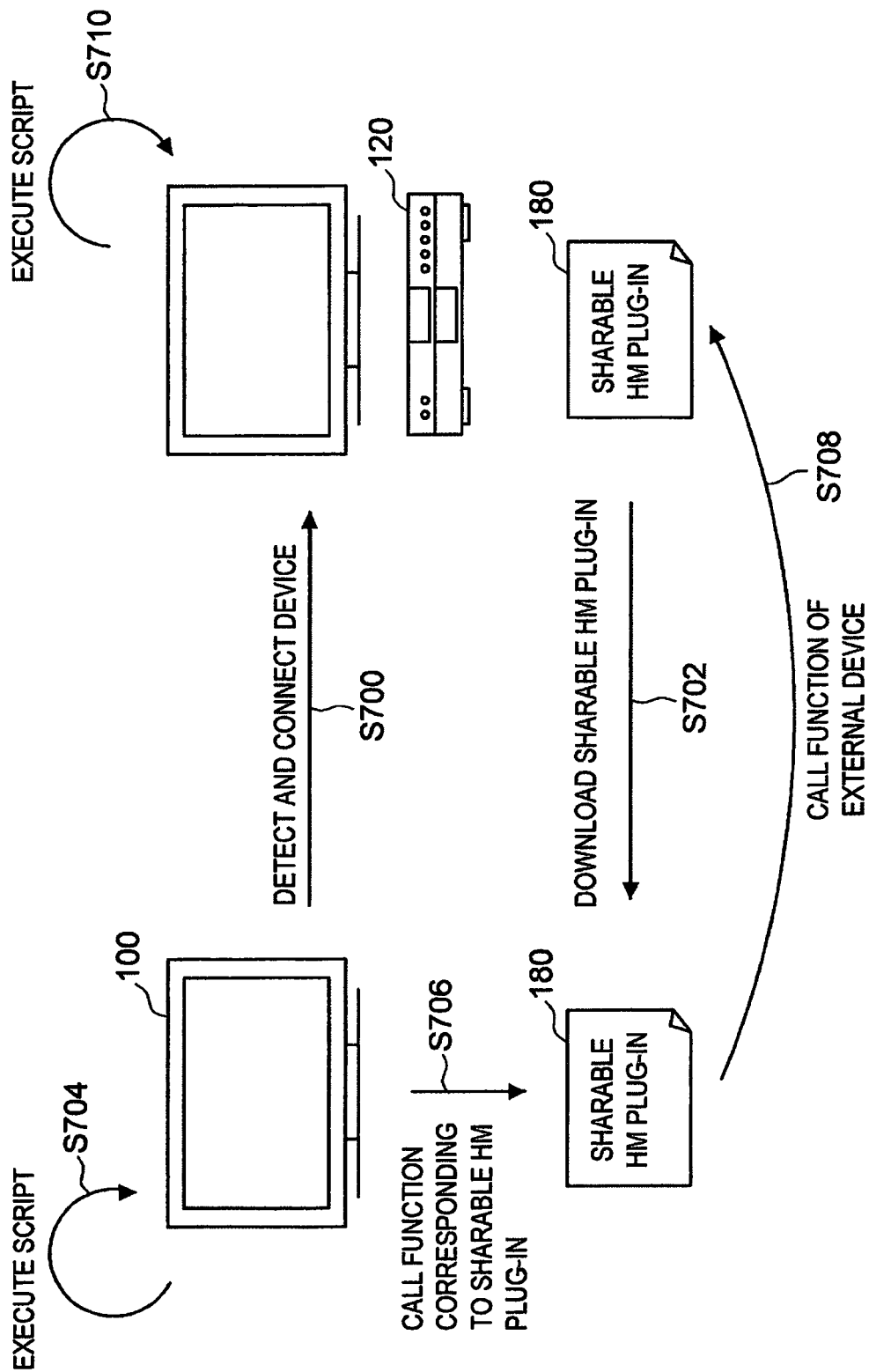
FIG. 9 is a diagram showing a flow of coordinate processing according to the second embodiment.

Referring to FIG. 9, next, the outline of coordinate processing performed in the system according to the second embodiment will be described. FIG. 9 is a diagram showing the flow of coordinate processing according to the second embodiment.

It is assumed that the television receiver 100 and digital recorder 120 are operated. First, the television receiver 100 detects, as a device capable of sharing the HM plug-in, the digital recorder 120 on the home network 12 by use of the device detecting-and-connecting function (step S700). The television receiver 100 constructs a relation with the digital recorder 120 in order to execute the RPC. From the digital recorder 120, the television receiver 100 acquires via the device detecting-and-connecting function the package information of the sharable HM plug-in 180 that can be shared with the digital recorder 120. The package information includes information about the sharable HM plug-in 180 including a script scripting a function that can be provided as a menu item on a home menu, GUI components, and a GUI setting.

Upon acquiring the package information, the television receiver 100 downloads the package of the sharable plug-in 180 from the digital recorder 120 through the device detecting-and-connecting function (S702).

Upon downloading the package, the television receiver 100 executes through the script interpreting-and-executing function the script of the sharable HM plug-in 180 composing the package (S704). The sharable HM plug-in 180 registers its own interface in the HM function. The HM function acquires the GUI component and GUI setting, which together represent a menu item, from the shared plug-in 180 via the interface, and provides the HM application with this GUI component and GUI setting. The HM application displays the GUI component and GUI setting of the sharable HM plug-in 180 on the home menu as part of a GUI component group.

Upon a user's selecting a menu item displayed by the GUI component of the sharable HM plug-in 180, the HM application calls up the function of the sharable HM plug-in 180 via the HM function (S706).

Based on the relation with the digital recorder 120, which has been constructed in order to execute the RPC, the sharable HM plug-in 180 calls up the function that will be performed on the digital recorder 120 (S708). Upon the calling up of this function, the digital recorder 120 executes the script of the sharable HM plug-in 180 (S710). Thus, the function, e.g., recording/reproducing function, is performed on the digital recorder 120.

In the first example of a coordinate processing according to the first embodiment described above, the coordinate function data is provided to the television receiver 100 from the digital recorder 120, and a function is selected through the operation performed by a user. Then, based on behavior information included in the coordinate function data, the digital recorder 120 is informed of the function ID of the selected function. Based on the informed function ID, the digital recorder 120 performs a predetermined process for achieving the coordinate function. In this case, between the television receiver 100 and the digital recorder 120, the coordinate function data (e.g., a function name, function type, function ID, behavior information about the function) is transmitted from the digital recorder 120 to the television receiver 100, and the function ID of the selected function is transmitted from the television receiver 100 to the digital recorder 120.

That is, in the first example of the first embodiment, based on the coordinate function data acquired from the digital recorder 120, predetermined processing control is executed by the television receiver 100. To achieve this, it is enough for the television receiver 100 to incorporate a module capable of executing predetermined processing control. To execute this predetermined processing control, it is enough for the television receiver 100 to implement a function scripted in an object code. This obviates the need for an environment provided to execute the function scripted in the script language. However, since the foregoing is based on the assumption that the predetermined processing control is exerted, compatibility with function expansion is low, thus limiting the potential scope of the menu function.

Therefore, instead of transmission and reception of data between the devices and the predetermined processing control, coordinate processing according to the second embodiment executes the script of the sharable HM plug-in 180 that can be shared by the devices. Thereby, according to behavior specified by the script, coordinate processing executes various forms of processing control such as displaying an option menu based on an operation performed by a user. Accordingly, coordinate processing enhances compatibility with function expansion and facilitates expansion of the menu function.

[Example of Function Configuration of Devices]

Figure 10:
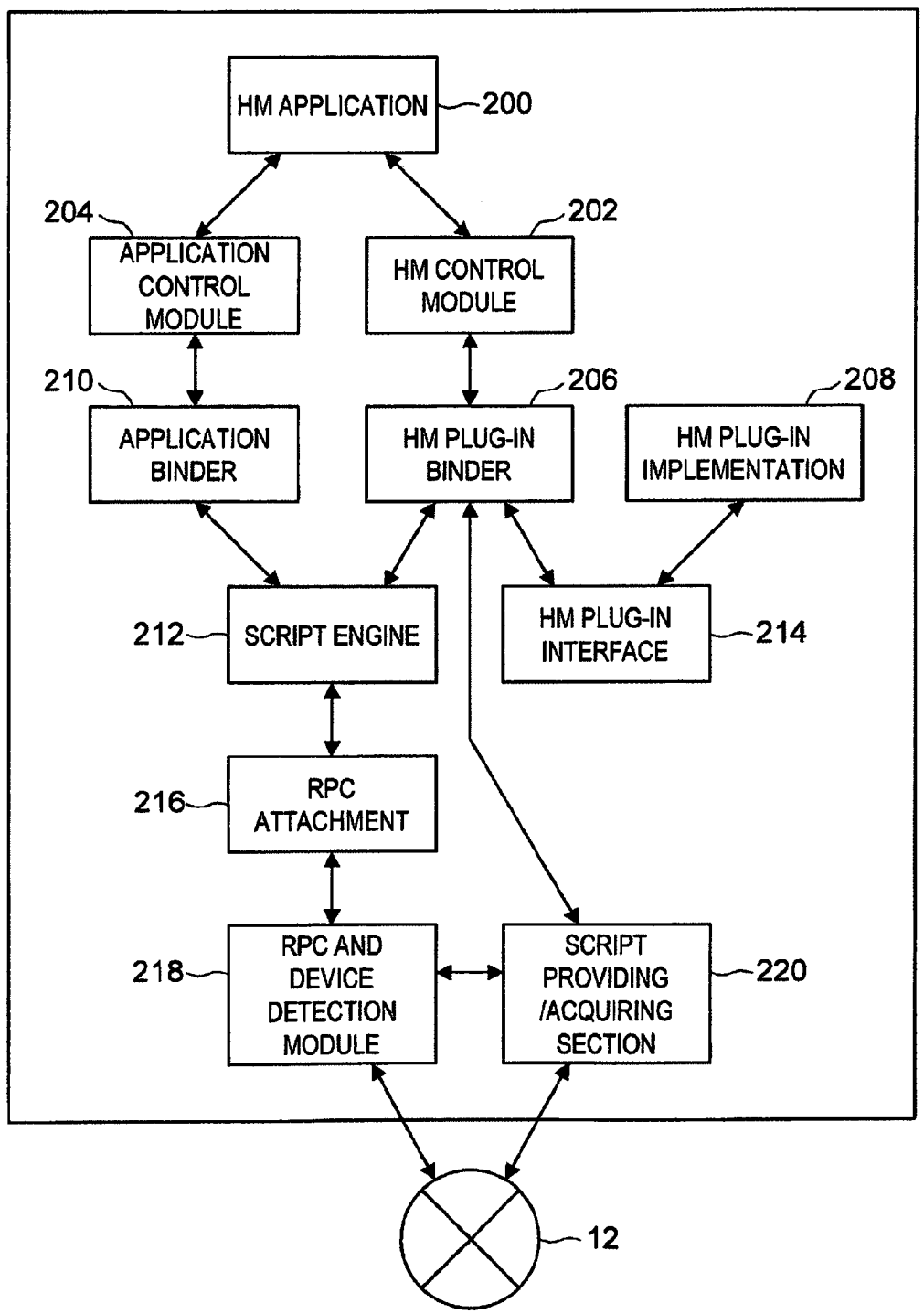
FIG. 10 is a block diagram showing an example of the function configuration of the television receiver and digital recorder according to the second embodiment.

Next, the function configuration of the television receiver 100 and digital recorder 120 will be described with reference to FIG. 10. FIG. 10 is a block diagram showing an example of the function configuration of the television receiver 100 and digital recorder 120 according to the second embodiment.

As shown in FIG. 10, the television receiver 100 and digital recorder 120 includes an HM application 200, HM control module 202, application control module 204, HM plug-in binder 206, HM plug-in implementation 208, application binder 210, script engine 212, HM plug-in interface 214, RPC attachment 216, RPC and device detection module 218, script providing/acquiring section 220.

The HM application 200 provides a common GUI environment as a home menu. The HM application 200 registers its own interface in the HM control module 202 and the application control module 204.

The HM control module 202 controls operation of a home menu on the television receiver 100. The application control module 204 controls operation of applications on the television receiver 100.

The HM plug-in binder 206 manages various HM plug-ins, and binding-processes the script of the sharable HM plug-in 180. This allows interactions between the object code module function and script module function. The HM plug-in binder 206 registers the interface of the sharable HM plug-in 180 in the HM control module 202. This makes it possible for the HM control module 202 to handle the sharable HM plug-in 180 scripted in the script language, as in the HM plug-in scripted in the object code.

The HM plug-in implementation 208 is an object code module such as a TV plug-in, DLNA plug-in, or setting plug-in.

The application binder 210 manages various applications, and binding-processes the scripts of these applications. This allows interactions between the function of an application scripted in the object code and the function of the application scripted in the script language. The application binder 210 registers the interface of the application in the application control module 204. This makes it possible for the application control module 204 to handle an application scripted in the script language, as in the application scripted in the object code.

The script engine 212 interprets the script of the application and/or sharable HM plug-in 180, and executes a behavior specified by the script on a device (i.e., the television receiver 100 in the case of the second embodiment).

The HM plug-in interface 214 provides a common function used in the home menu by various HM plug-ins and by the sharable HM plug-in 180, such as creation of GUI component (Get Item), acquisition of menu information (Get Level Info) or the processing of an event (Handle Item).

The RPC attachment 216 makes it possible to execute the RPC from the script of the sharable HM plug-in 180. The RPC attachment 216 registers its own interface in the sharable HM plug-in 180.

The RPC and device detection module 218 detects on the home network 12 another device with the same common application framework. In addition, the module 218 calls up through the RPC a function to be performed on another device (i.e., digital recorder 120 in the case of the second embodiment).

The script providing/acquiring section 220 provides/acquires an application scripted in the script language and/or the sharable HM plug-in 180 for/from another device located on the home network 12. In the second embodiment, the script providing/acquiring section 220 functions as a script downloader on the television receiver 100, and as a script server on the digital recorder 120. Thus, the sharable HM plug-in 180 scripted in the script language is provided for the television receiver 100 by the digital recorder 120.

In this case, the sharable HM plug-in 180 is provided or acquired in the form of a bundle in which script, layout (which has been scripted in, e.g., a mark-up language), resource file (e.g., dictionary file or image file) are bound together. In addition, the sharable HM plug-in 180 may be selectively acquired by independently downloading bundle-composing files based on bundle-composing information (which includes the ID information of the script and file) provided in advance.

[Flow of Coordinate Processing]

Referring to FIG. 11, next, the flow of coordinate processing performed by the home network system that has the function configuration shown in FIG. 10 will be described. FIG. 11 is a diagram showing a sequence of the coordinate processing performed by the home network system that has a function configuration shown in FIG. 10.

To start coordinate processing, the RPC and device detection module 218 of the television receiver 100 detects on the home network 12 another device (i.e., the digital recorder 120 in the case of the second embodiment) that has the same common application framework (S800). When detecting the digital recorder 120, the RPC and device detection module 218 constructs a relation with the RPC and device detection module 218 of the digital recorder 120 in order to perform coordinate processing (S802).

When a relation for coordinate processing has been constructed, the script downloader (i.e., script providing/acquiring section 220) of the television receiver 100 downloads the sharable HM plug-in 180 such as recording/reproducing function from the script server (i.e., script providing/acquiring section 220) of the digital recorder 120, and loads in the HM plug-in binder 206 (S804).

When the sharable HM plug-in 180 is loaded, the HM plug-in binder 206 binding-processes the sharable HM plug-in 180, and requests the script engine 212 to compile and execute scripts from the sharable HM plug-in 180 (S806). At this time, the interface of the sharable HM plug-in 180 is registered in the HM control module 202. In addition, the interface of the RPC attachment 216 is registered in the HM control module 202 via the sharable HM plug-in 180 (S808).

To download an application, the script downloader (i.e., script providing/acquiring section 220) loads the application in the application binder 210. The application binder 210 binding-processes the application, and requests the script engine 212 to compile and execute the scripts from the application.

Upon the execution of a script on the sharable HM plug-in 180, the HM control module 202 acquires, from the sharable HM plug-in 180, a GUI setting and GUI component together representing a menu item via the registered interface. Then, the HM control module 202 provides the HM application 200 with the acquired GUI component and GUI setting via an interface registered in advance by the HM application 200 (S810). According to the GUI setting, the HM application 200 displays the provided GUI component as a menu item (e.g., a menu item for recording/reproducing function) on a menu screen (S812).

If the menu item displayed on the menu screen is selected at this time by a user (S814), the HM application 200 informs the HM control module 202 of the selection of the menu item via the interface. The HM control module 202 calls up the sharable HM plug-in 180 via the interface (S816).

When the function of the sharable HM plug-in 180 is called up, the sharable HM plug-in 180 requests, via the RPC function, the RPC and device detection module 218 of the television receiver 100 to execute the RPC. The RPC and device detection module 218 calls up, via the RPC and device detection module 218 of the digital recorder 120, the function to be performed on the digital recorder 120 (S818). Thus, the sharable HM plug-in 180 is executed on the digital recorder 120 by the RPC from the sharable HM plug-in 180, and predetermined processing for executing the function of the menu item selected on the home menu is performed.

Although the invention has been described in its preferred embodiments with reference to the accompanied drawings, the invention is not limited to the examples described above. Various changes and modifications within the scope of the appended claims will readily occur to those skilled in the art. Accordingly, it is understood that all these modifications and equivalents also fall within the scope of the invention.

What is claimed is:

1. An information processing apparatus comprising:
a receiving section that receives function information about one or more functions from an external device connected via a network, wherein the one or more functions can be executed by coordination between the external device and the information processing apparatus;
a display section that displays a list of the functions of the external device that can be executed by coordination between the external device and the information processing apparatus, the functions being included in the function information and being displayed to be selectable;
a selected-information acquiring section that acquires selected information pertaining to a function selected by a user from the list of the functions displayed by the display section; and
a coordinate function executing section that causes the external device to execute at the external device the function selected by the user;
wherein the function information includes information about a place from which a program corresponding to each of the functions is acquired, and the coordinate function executing section causes the external device to execute the selected function by acquiring the program from the place corresponding to the function selected by the user and by running the program.

2. The information processing apparatus according to claim 1, wherein the function information includes an identification information corresponding to each of the functions, and
the coordinate function executing section transmits the identification information corresponding to the function selected by the user to the external device.

3. The information processing apparatus according to claim 1, wherein the function information includes a script type execution module that controls the process of remotely calling up each of the functions, and
the coordinate function executing section executes the execution module, remotely calls up from the external device the function selected by the user, and causes the external device to execute the selected function.

4. The information processing apparatus according to claim 1, wherein the receiving section further receives a function display request to display the list of the functions included in the function information, and
according to the function display request, the display section displays the list of the functions of the external device that can be executed by coordination between the external device and the information processing apparatus included in the function information.

5. An information processing apparatus comprising:
a transmitting section that transmits function information about one or more functions to an external device connected via a network, wherein the one or more functions can be executed by coordination between the external device and the information processing apparatus; and
a coordinate function executing section that executes a function selected by a user of the external device from a displayed list of the functions that can be executed by coordination between the external device and the information processing apparatus, the functions being included in the function information and being displayed to be selectable;
wherein the function information includes information about a place from which a program corresponding to each of the functions is acquired, and
the external device executes the program corresponding to the function selected by the user from the functions included in the function information, and thereby the coordinate function executing section performs the selected function.

6. The information processing apparatus according to claim 5, wherein the function information includes identification information corresponding to each of the functions, and
the coordinate function executing section receives the identification information corresponding to the function selected by the user from the functions included in the function information from the external device, and executes the function corresponding to the identification information.

7. The information processing apparatus according to claim 5, wherein the function information includes a script type execution module that controls the process of remotely calling up each of the functions, and
the external device executes the execution module, and the function included in the function information is remotely called up from the external device, and thereby the coordinate function executing section executes the selected function.

8. The information processing apparatus according to claim 5, further comprising an external device searching section that searches the external device connected via the network, wherein the transmitting section further transmits a function display request for displaying a list of the functions included in the function information.

9. The information processing apparatus according to claim 8, wherein according to the type of the external device searched by the external device searching section, the transmission section selects one or more functions included in the function information.

10. An information processing method comprising the steps of:

receiving function information about one or more functions from an external device connected via a network, wherein the one or more functions can be executed by coordination between the external device and an information processing apparatus;

displaying a list of the functions of the external device that can be executed by coordination between the external device and the information processing apparatus, the functions being included in the function information and being displayed to be selectable;

receiving information pertaining to a function selected by a user from the list of the functions displayed in the displaying step; and causing the external device to execute at the external device the function selected by the user;

wherein the function information includes information about a place from which a program corresponding to each of the functions is acquired, and the coordinate function executing section causes the external device to execute the selected function by acquiring the program from the place corresponding to the function selected by the user and by running the program.

* * * * *